United States Patent
Aimura et al.

(10) Patent No.: US 9,073,484 B2
(45) Date of Patent: Jul. 7, 2015

(54) SURROUNDING AREA MONITORING APPARATUS FOR VEHICLE

(75) Inventors: Makoto Aimura, Saitama (JP); Yusuke Nakamura, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 337 days.

(21) Appl. No.: 13/580,864

(22) PCT Filed: Feb. 14, 2011

(86) PCT No.: PCT/JP2011/000803
§ 371 (c)(1),
(2), (4) Date: Aug. 23, 2012

(87) PCT Pub. No.: WO2011/108198
PCT Pub. Date: Sep. 9, 2011

(65) Prior Publication Data
US 2012/0320212 A1    Dec. 20, 2012

(30) Foreign Application Priority Data
Mar. 3, 2010    (JP) .................................. 2010-047161

(51) Int. Cl.
*B62D 15/02* (2006.01)
*B60Q 1/52* (2006.01)
(Continued)

(52) U.S. Cl.
CPC .............. *B60R 1/00* (2013.01); *G01C 21/3602* (2013.01); *G06K 9/00805* (2013.01);
(Continued)

(58) Field of Classification Search
CPC ................ G01S 2013/9375; G01S 2013/9378; G01S 13/867; G01S 17/936; G06K 9/00805; G06K 9/00362; G02B 2027/0181; G06T 2207/30261; G06T 2207/30248; G01C 21/365; B60Q 1/525; B60Q 5/006; B60R 2300/8093; B60R 2300/308; B60R 2300/8033; B60R 21/013; B62D 15/029; B60W 30/08; B60W 50/14; B60W 2050/143

USPC .................. 348/113, 118, 148, 149; 340/901, 340/995.19, 995.25, 995.28; 701/9, 301, 701/411, 433, 442, 519
See application file for complete search history.

(56) References Cited

U.S. PATENT DOCUMENTS

| 6,281,806 B1 * | 8/2001 | Smith et al. ................... 340/901 |
| 7,782,184 B2 * | 8/2010 | Wittorf et al. ................. 340/468 |

(Continued)

FOREIGN PATENT DOCUMENTS

| JP | 2003-284057 A | 10/2003 |
| JP | 2007-159036 A | 6/2007 |

(Continued)

OTHER PUBLICATIONS

Japanese Office Action dated Aug. 5, 2014 issued in the corresponding JP Patent Application 2012-502982.

*Primary Examiner* — Brian Yenke
(74) *Attorney, Agent, or Firm* — Carrier Blackman & Associates, P.C.; Jospeh P. Carrier; Jeffrey T. Gedeon

(57) ABSTRACT

A surrounding area of a vehicle is imaged, and target objects in the area are detected based on captured images. A driver is warned of the presence of the detected target objects by displaying a warning indication on the displayed image. If a total number of simultaneously detected target objects is equal to or less than a specified number, the warning indication of a first display mode is applied in which each target object is emphasized individually. If the total number is more than the specified number, the warning indication of a second warning display mode is applied in which one emphasized indication predefined is displayed for the whole displayed image without displaying the warning indication of the first display mode. The warning image becomes easier to understand for a driver, compared to an image where all detected objects are always emphasized individually regardless of the total number of them.

12 Claims, 12 Drawing Sheets

(51) Int. Cl.
*G06K 9/00* (2006.01)
*G01S 13/93* (2006.01)
*B60R 21/13* (2006.01)
*B60R 1/00* (2006.01)
*G01C 21/36* (2006.01)
*G08G 1/16* (2006.01)

(52) U.S. Cl.
CPC .......... *G08G 1/166* (2013.01); *B60R 2300/106* (2013.01); *B60R 2300/207* (2013.01); *B60R 2300/307* (2013.01); *B60R 2300/8093* (2013.01)

(56) References Cited

U.S. PATENT DOCUMENTS

| | | | |
|---|---|---|---|
| 2006/0126898 A1* | 6/2006 | Nagaoka et al. | 382/103 |
| 2006/0177097 A1* | 8/2006 | Fujimura et al. | 382/103 |
| 2006/0192660 A1* | 8/2006 | Watanabe et al. | 340/435 |
| 2007/0061066 A1* | 3/2007 | Bruelle-Drews | 701/200 |
| 2007/0206849 A1* | 9/2007 | Sakata et al. | 382/157 |
| 2007/0230792 A1* | 10/2007 | Shashua et al. | 382/190 |
| 2008/0008355 A1* | 1/2008 | Okamoto et al. | 382/104 |
| 2009/0153662 A1* | 6/2009 | Abel et al. | 348/148 |
| 2009/0160678 A1* | 6/2009 | Turnbull | 340/944 |
| 2009/0303078 A1* | 12/2009 | Mochizuki et al. | 340/901 |
| 2010/0079590 A1* | 4/2010 | Kuehnle et al. | 348/118 |
| 2010/0253489 A1* | 10/2010 | Cui et al. | 340/425.5 |
| 2010/0253539 A1* | 10/2010 | Seder et al. | 340/903 |
| 2010/0253541 A1* | 10/2010 | Seder et al. | 340/905 |
| 2010/0253542 A1* | 10/2010 | Seder et al. | 340/932.2 |
| 2010/0253543 A1* | 10/2010 | Szczerba et al. | 340/932.2 |
| 2010/0253592 A1* | 10/2010 | Slobodin et al. | 345/2.3 |
| 2010/0253593 A1* | 10/2010 | Seder et al. | 345/7 |
| 2010/0253594 A1* | 10/2010 | Szczerba et al. | 345/7 |
| 2010/0253595 A1* | 10/2010 | Szczerba et al. | 345/7 |
| 2010/0253596 A1* | 10/2010 | Szczerba et al. | 345/7 |
| 2010/0253597 A1* | 10/2010 | Seder et al. | 345/7 |
| 2010/0253599 A1* | 10/2010 | Szczerba et al. | 345/7 |
| 2010/0253601 A1* | 10/2010 | Seder et al. | 345/7 |
| 2010/0253602 A1* | 10/2010 | Szczerba et al. | 345/8 |
| 2010/0289632 A1* | 11/2010 | Seder et al. | 340/436 |
| 2010/0292886 A1* | 11/2010 | Szczerba et al. | 701/29 |
| 2011/0128138 A1* | 6/2011 | Yamamoto et al. | 340/436 |
| 2011/0133917 A1* | 6/2011 | Zeng | 340/436 |
| 2011/0187863 A1* | 8/2011 | Glander et al. | 348/148 |
| 2011/0199199 A1* | 8/2011 | Perkins | 340/435 |
| 2011/0228980 A1* | 9/2011 | Ichikawa et al. | 382/103 |
| 2011/0234422 A1* | 9/2011 | Yamashita | 340/901 |
| 2011/0313617 A1* | 12/2011 | Omote et al. | 701/36 |
| 2012/0216208 A1* | 8/2012 | Takemura et al. | 718/103 |
| 2012/0219183 A1* | 8/2012 | Mori et al. | 382/103 |
| 2012/0271540 A1* | 10/2012 | Miksa et al. | 701/409 |
| 2012/0314071 A1* | 12/2012 | Rosenbaum et al. | 348/148 |
| 2012/0314074 A1* | 12/2012 | Aimura et al. | 348/148 |
| 2012/0323479 A1* | 12/2012 | Nagata | 701/301 |
| 2013/0010112 A1* | 1/2013 | Goto et al. | 348/148 |
| 2013/0027196 A1* | 1/2013 | Yankun et al. | 340/435 |
| 2013/0027557 A1* | 1/2013 | Hirai et al. | 348/148 |
| 2013/0044218 A1* | 2/2013 | Matsuda et al. | 348/148 |
| 2013/0051042 A1* | 2/2013 | Nordbruch | 362/466 |
| 2013/0093579 A1* | 4/2013 | Arnon | 340/425.5 |
| 2013/0093583 A1* | 4/2013 | Shapiro | 340/436 |
| 2013/0107052 A1* | 5/2013 | Gloger et al. | 348/148 |
| 2013/0116859 A1* | 5/2013 | Ihlenburg et al. | 701/2 |
| 2013/0181823 A1* | 7/2013 | Stahlin et al. | 340/436 |
| 2013/0251194 A1* | 9/2013 | Schamp | 382/103 |
| 2013/0314221 A1* | 11/2013 | Taylor et al. | 340/435 |
| 2013/0314503 A1* | 11/2013 | Nix et al. | 348/46 |
| 2013/0321628 A1* | 12/2013 | Eng et al. | 348/148 |
| 2014/0002295 A1* | 1/2014 | Kimata et al. | 342/70 |
| 2014/0035740 A1* | 2/2014 | Lettstrom et al. | 340/479 |
| 2014/0072176 A1* | 3/2014 | Orecher | 382/103 |
| 2014/0132407 A1* | 5/2014 | Kumai et al. | 340/439 |
| 2014/0133700 A1* | 5/2014 | Seki | 382/103 |
| 2014/0139676 A1* | 5/2014 | Wierich | 348/148 |
| 2014/0270378 A1* | 9/2014 | Aimura et al. | 382/103 |
| 2014/0285667 A1* | 9/2014 | Aimura | 348/148 |

FOREIGN PATENT DOCUMENTS

| | | |
|---|---|---|
| JP | 2008-152438 A | 7/2008 |
| JP | 2009-098956 A | 5/2009 |

* cited by examiner (a)

(b)

(a)

(b)

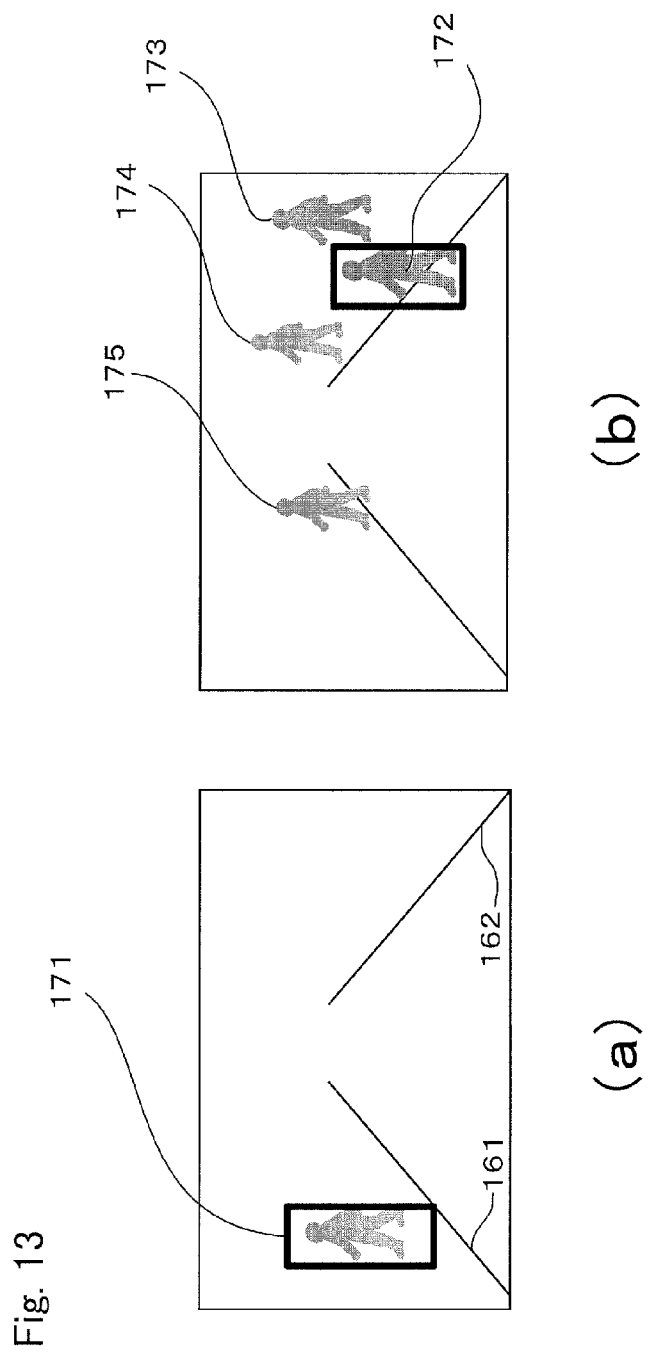

SURROUNDING AREA MONITORING APPARATUS FOR VEHICLE

FIELD OF THE INVENTION

The present invention relates to an apparatus for monitoring a surrounding area around a vehicle, more particularly an apparatus for detecting and displaying target objects in the surrounding area.

RELATED ART

The following patent document 1 discloses a system that detects target objects around a vehicle, using an infrared camera. If the system determines the target object to be a pedestrian, a driver is notified of it with images and sounds.

PRIOR ART DOCUMENT

Patent Document 1: JP 2003-284057 A

SUMMARY OF THE INVENTION

Problem to be Solved

The system in the Patent Document 1 has a Head Up Display (HUD) mounted on the vehicle for displaying an image captured by the infrared camera. In order to notify of the presence of the target objects, the system emphasizes each image of the target object with a frame.

However, when there exist many target objects that are detected in the camera image, the individual emphasis on each target object could have adverse effect on the visibility of the displayed image. Therefore, the system has a room for improvement on the display image so that a driver could understand it more quickly.

The HUD is mounted in front of the driver, so that the driver can get a display image in his sight with relatively small eye movement. However, the HUD is often not equipped in an general type of vehicles. In contrast, a dashboard display, a display device attached to a dashboard, comes into wide use. Especially, the display device for providing various information such as cartographic information given by a navigation function, is increasingly used, as a navigation system is widespreading.

Such a general type of display device is attached not only to frontward but also a left side or a right side of the driver, so that large eye movement is required for the driver to look at the display image. Consequently, the display image is desired to be instantaneously understandable to the driver.

Accordingly, a technique is desired that can generate a display image quickly understandable to the driver even in a situation where there exist many target objects to be notified.

Solution to the Problem

According to an aspect of the present invention, a surrounding monitoring apparatus for vehicle includes a imaging device, mounted on a vehicle, that images an area around the vehicle, and a device that detects target objects in the area on the basis of images captured by the imaging device. Further, the apparatus includes a device that presents the captured images on a display device, and a warning device that warns a driver of the detected objects by presenting a warning indication in the image on the display device. In this apparatus, when a total number of the target objects simultaneously detected is equal to or less than a predetermined number, the warning device presents the warning indication of a first display mode that includes an indication emphasizing each target object. And, when the total number is greater than the predetermined number, the warning device presents the warning indication of a second display mode that includes one emphasized indication predefined, for the whole displayed image, without presenting the warning indication of the first display mode.

In this aspect of the present invention, when detected target objects are relatively few, each target object are emphasized. In this case, the target objects are individually emphasized. On the other hand, when the detected target objects are relatively many, one emphasized indication is displayed for a whole display screen. Therefore, the displayed image may be more distinguishable and more understandable, compared with a image where all target objects are always emphasized individually regardless of the number of them. By only glancing at the one emphasized indication on the display, a driver can instantaneously understand that there exist many target objects around the vehicle, to which he should pay his attention. Thereby, the driver can concentrate on a driving operation without being disturbed by the displayed image.

According to one embodiment, when a total number of the target objects simultaneously detected is more than the predetermined number, the warning device superimposes a predefined image at a predetermined position onto the displayed image on the device, as the one emphasized indication of the second displayed mode.

In this embodiment, when the detected target object is more than the specified number, the warning indication is given as a predefined image superimposed at a specified position onto the displayed image. Therefore, the displayed image may be more distinguishable and more understandable, compared with a image where all target objects are always emphasized individually regardless of the number of them. By an emergence of the specified image on the display screen, the driver can instantaneously understand that there exist many target objects around the vehicle, to which he should pay his attention.

According to another embodiment of the present invention, when the number of the target objects simultaneously detected is greater than the predetermined number, the warning device determines a priority for warning of each of the detected target object, and emphasizes the target object having the highest priority, as the one emphasized indication of the second display mode.

In this embodiment of the present invention, when the detected target objects are greater than the specified number, only the target object determined to have the highest priority for warning is emphasized. Therefore, the displayed image may be more distinguishable and more understandable, compared with a image where all target objects are always emphasized individually regardless of the number of them. Because only the highest-priority object is emphasized, the driver can instantaneously understand that there exist many target objects around the vehicle, to which he should pay his attention.

According to one embodiment of the present invention, the display device is shared with a car navigation system.

In this embodiment, the display device of the car navigation system can be utilized efficiently to notify the driver of the presence of the target objects around the vehicle.

Other features and advantages of the present invention will become apparent from the following detailed descriptions.

BRIEF DESCRIPTION OF THE DRAWINGS

FIG. 13 is a view showing a warning indication according to one embodiment of the present invention.

DESCRIPTION OF EMBODIMENTS

Figure 1:
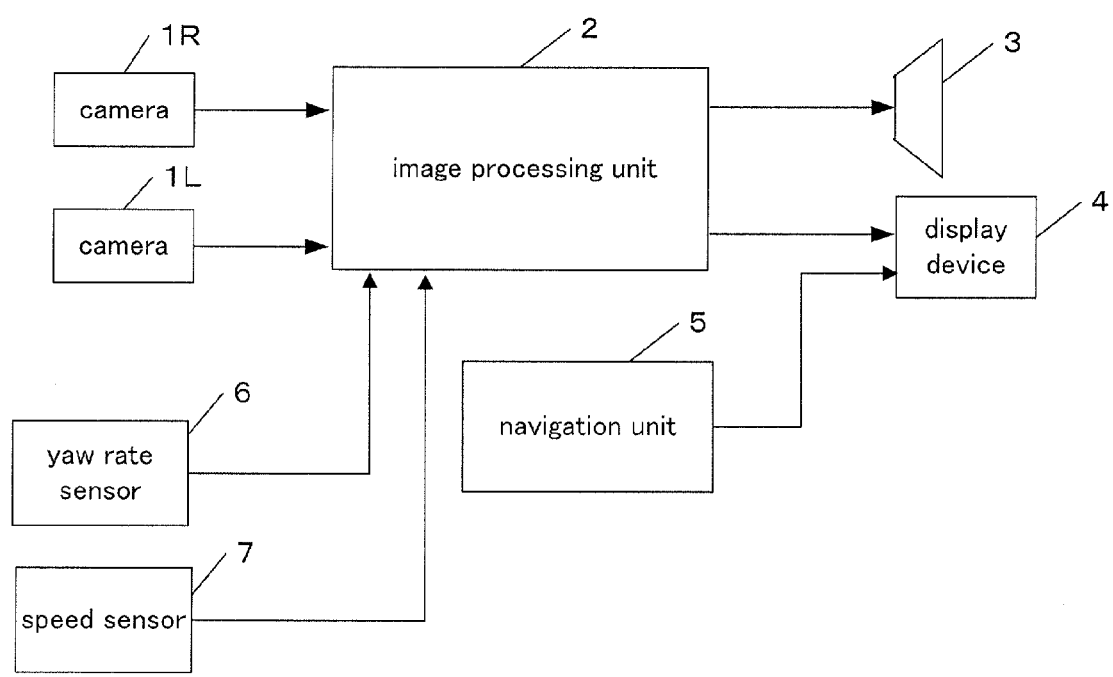
FIG. 1 is a block diagram showing a configuration of a surrounding area monitoring apparatus for vehicle according to one embodiment of the present invention.
Figure 2:
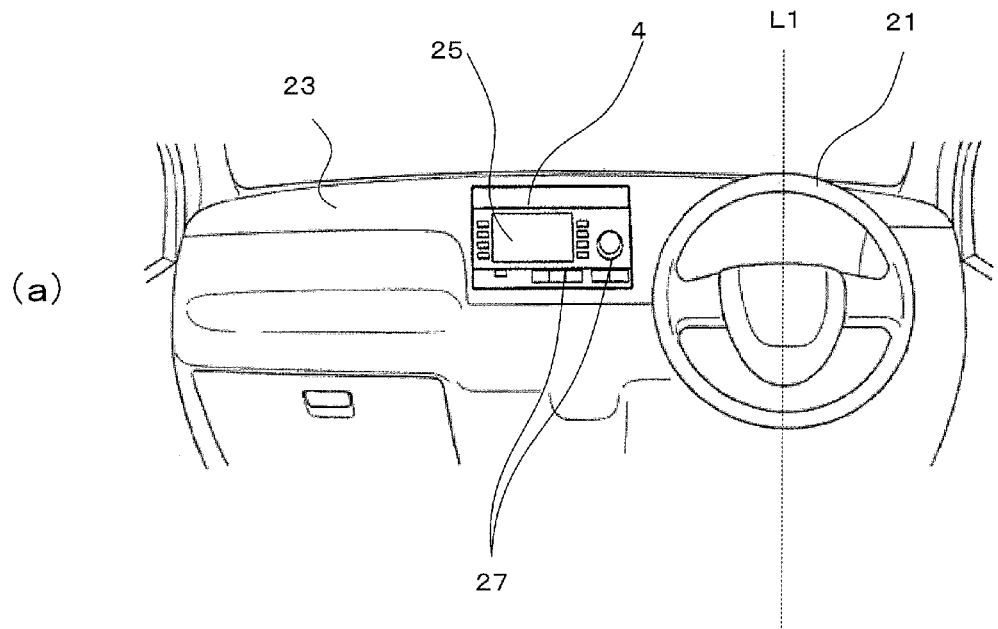
FIG. 2 is a view for explaining where to mount a display device and a camera according to one embodiment of the present invention.
Figure 2:
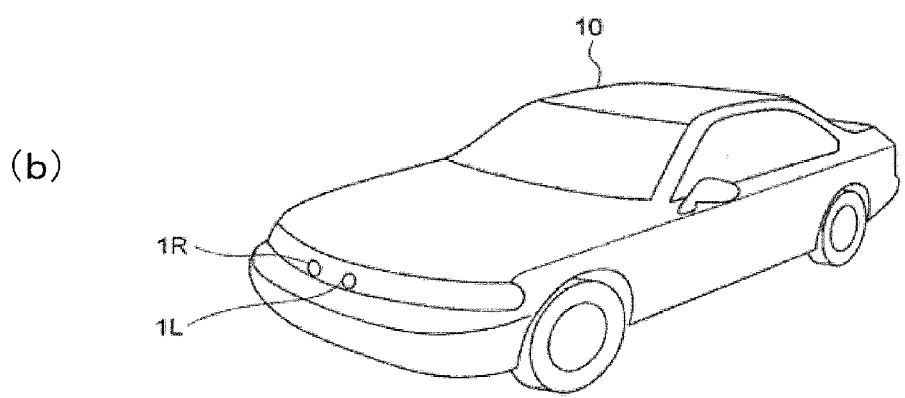

Hereinafter, a description will be made to embodiments of the present invention with reference to the accompanying drawings. FIG. 1 is a block diagram showing a configuration of a surrounding area monitoring apparatus according to one embodiment of the present invention, which utilizes a display device of a navigation system. FIG. 2 is a view showing an arrangement of a display device and a camera, mounted on a vehicle.

The vehicle has a navigation system mounted thereon, and this system includes a navigation unit 5 and a display device 4. As shown in FIG. 2A, the display device 4 is mounted at a predetermined distance from a line L1 passing through the center of a handle 21 (steering wheel) and extending in a back and forth direction of the vehicle (note: In FIG. 2A, L1 is shown in a manner as to extend in a vertical direction of the vehicle for easier understanding), so as to allow the driver to see the display device 4. In this embodiment, the display device 4 is embedded in a dashboard 23 of the vehicle.

The navigation unit 5 is a computer including a Central Processing Unit (CPU) and a memory. The navigation unit 5 detects a current location of a vehicle 10, for example, by receiving a GPS signal for satellite-based localization, via a communication equipment (not shown) in the unit 5. The navigation unit 5 displays cartographic information around the vehicle on a screen 25 of the display device 4, and superimposes an image representing the current position of the vehicle 10. (The cartographic information may be stored in a memory device in the navigation system or be received from a specific server via the communication equipment.) The screen 25 is equipped with a touch panel. Using this touch panel or other input device 27 such as keys and buttons, a passenger can input a destination into the navigation unit 5. The navigation unit 5 calculates the optimum route to the destination, and superimposes the image of the route on the cartographic information displayed on the screen 25.

Recent navigation systems have various capabilities, such as traffic information and guidance on facilities in the vicinity of the vehicle. In this embodiment, any proper navigation system may be used.

This surrounding monitoring apparatus includes two infrared cameras 1R and 1L mounted on the vehicle 10, which detect far infrared light. The apparatus includes also an image processing unit 2 for detecting target objects around the vehicle based on image data from the cameras 1R and 1L. The apparatus further includes a speaker 3 for producing a warning with sounds or voices, based on a results of the object detection. The display device 4 displays the images captured by the camera 1R or 1L as well as the images for notifying a driver of the target objects around the vehicle. Moreover, the apparatus includes a yaw rate sensor 6 and a speed sensor 7, for detecting a yaw rate and a driving velocity (speed) of the vehicle, respectively. The detection results of these sensors are sent to the image processing unit 2.

In this embodiment, as shown in FIG. 2B, the cameras 1R and 1L are positioned at the front of the vehicle 10 for capturing images of an area ahead of the vehicle, and are arranged symmetrically with respect to an axis passing through the center of a vehicle width. These cameras 1R and 1L are fixed to the vehicle so that their optical axes are parallel with each other and their height from a road surface is equal. The infrared cameras 1R and 1L have characteristics that the higher the temperature of the target objects, the higher the level of output signals for them (i.e., the higher the brightness of captured object images)

The image processing unit 2 includes an A/D converter for converting an analog signal into a digital signal, a image memory for storing a digitized image signal, a Central Processing Unit (CPU) for performing various arithmetic processing. The unit 2 includes also a Random Access Memory (RAM) that the CPU stores data during operation, and a Read Only Memory (ROM) for storing a program to be executed by the CPU and data (including a table and a map) used for the execution. The unit 2 further includes an output circuit for providing signals such as a drive signal to the speaker 3 and a display signal to the display device 4. The unit 2 is configured so that signals from the camera 1R and 1L are converted into digital signals and then provided to the CPU.

In this embodiment, the display device 4 in the navigation system is utilized to display the captured images from the cameras 1R and 1L as well as the image for notifying (warning) the driver of the presence of the predetermined target objects detected from the captured image. As described above, unlike the HUD mounted at a position where images are displayed in front of the driver, the display device 4 is mounted at a predetermined distance from a handle 21 in a width direction of the vehicle. Therefore, compared with the HUD, the driver's eye movement for looking at the display device 4 is large, and thus the driver needs longer time to get the display image in his sight. Consequently, the images for notifying the driver of the presence of the target objects through the display device 4, are desired to be more easy to understand, that is, more quickly understandable, as compared with the image displayed on the HUD. The present invention enables to display such images. In a word, if there exits the target objects equal to or less than a predetermined number in the captured image (e.g., 1), predefined emphasis is applied to each image of the target object. In contrast, if there exists the target objects more than the predetermined number, one emphasized indication is displayed against the whole display image. A specific technique for that will be explained below.

Figure 3:
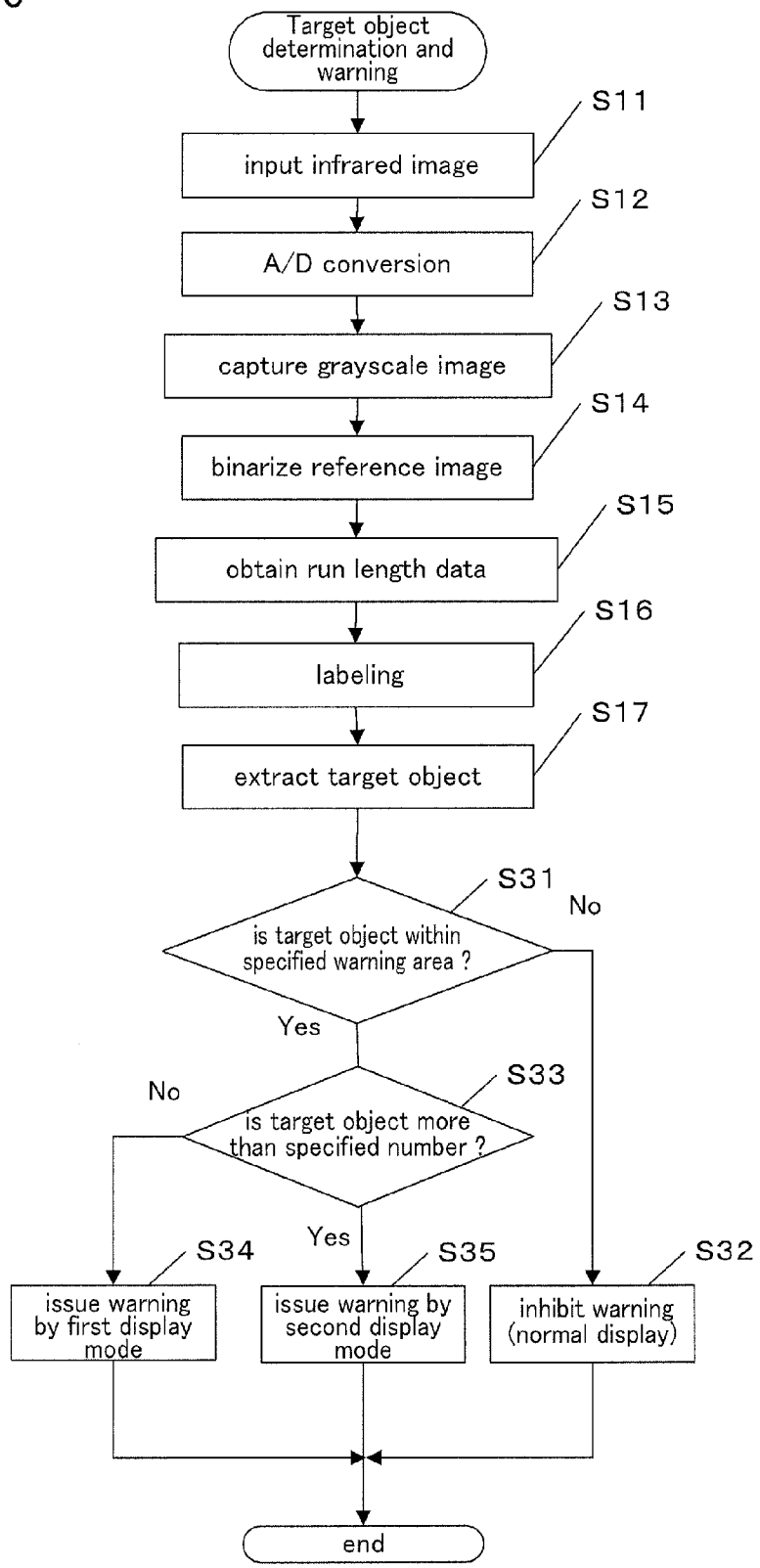
FIG. 3 is a flow chart showing a process to be executed in an image processing unit according to one embodiment of the present invention.

FIG. 3 is a flow chart showing a process to be executed by the image processing unit 2 according to a first embodiment. The process will be executed at predetermined intervals.

In steps S11 to S13, the image processing unit 2 performs A/D conversion of the input signals from the cameras 1R and 1L (i.e., data of captured image), and stores the converted signals in the image memory. The image data to be stored here is a grayscale image data containing intensity information.

In step S14, a right image captured by the camera 1R is used as a reference image (alternatively, a left image may be used as a reference image), and the reference image data are binarized. Specifically, data "1" (white) is set to a pixel having an intensity larger than a predetermined threshold level ITH, and data "0" (black) is set to a pixel having an intensity less than the predetermined threshold level ITH. The threshold level ITH can be determined by using any proper technique. After this binarization process, a target object having higher temperature than a predetermined level, such as a living body, is extracted as a white area.

In step S15, run length data is extracted from the binary image data. Specifically, the run length data comprises a coordinate of a start point and a length, of a white area of each pixel line (this white pixel line is called simply as "line"). (i.e., the start point is a pixel at a left edge of the line, and the length is the number of pixels of the line.) Here, y-axis is set to represent a vertical direction, and x-axis is set to represent a horizontal direction, in the image. For example, if the line at the y-coordinate y1 extends from (x1, y1) to (x3, y1), the run length data corresponding to the line is (x1, x3, 3), in which the length "3" indicates that the line comprises 3 pixels.

In steps S16 and S17, labeling and extraction of objects is performed. That is, from the lines expressed by the run length data, some lines overlapping in y direction are combined. And a set of these combined lines is considered as one target object, and is attached a label. In this way, one or more target objects are extracted.

Hereafter, an explanation will be made to a case where the extracted target object is a pedestrian. For improving a detection accuracy, determination processing may be executed after step S17, in order to decide whether the extracted target object is a pedestrian. This determination processing can be implemented by any proper technique. For example, similarity between the extracted target objects and a specified pattern representative of a pedestrian is calculated using the well-known pattern matching technique. If the similarity is high, the target object can be determined as a pedestrian. An example of such processing for the detection of a pedestrian is disclosed e.g., in JP 2007-241740 A and JP 2007-334751 A, etc.

Figure 4:
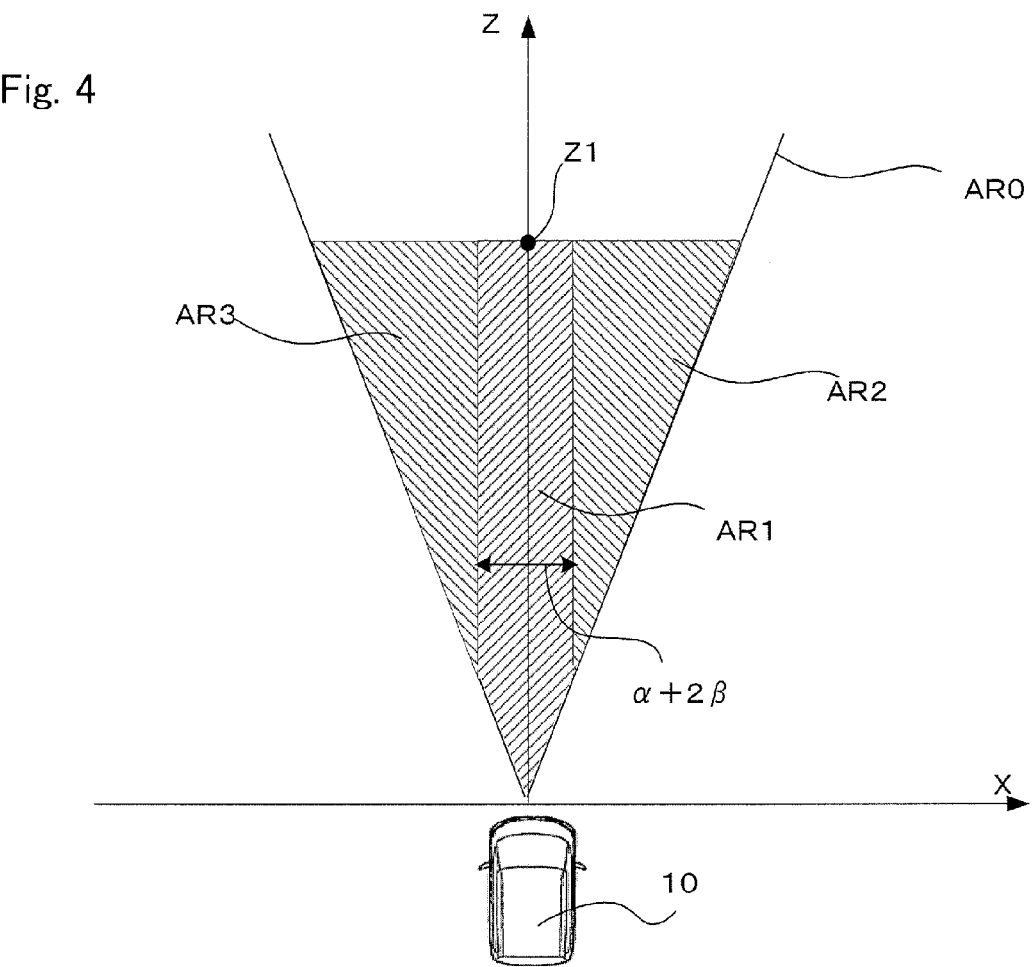
FIG. 4 is a view showing an imaging area and its subarea in front of a vehicle.

In step S31, it is determined whether the target object (here a pedestrian, as mentioned above) is present within a specified warning area around the vehicle. FIG. 4 shows one example of the specified warning area.

AR0 indicates an imaging area that is covered by the cameras 1R and 1L. In steps S11 to S17 of FIG. 3, the images captured in AR0 are processed.

AR1 is an area having a width defined by a width a of the vehicle 10 plus margins β for each side of it (e.g., β may be set to about 50 to 100 cm or so). In other words, this area has a half width of (α/2+α) at the both sides of a central axis in width direction of the vehicle 10. In the are of AR1 which is called here as an approach determination area, there is a high possibility of collision against target objects if they stay in this area. AR2 and AR3 are areas (outside of the approach determination area in a lateral direction) having an absolute value of the X coordinates larger than that of the approach determination area. These areas are referred as an entrance determination area, in which the target objects therein might enter into the approach determination area. Z1 defines a size of AR1-AR3 by restricting a distance from the vehicle, which may be set to a specified value.

In this embodiment, the approach determination area AR1 is used as a warning area. In step S31, It is determined whether the target object is in the warning area. If at least a part of the bottom of the target object, e.g., a foot of the pedestrian, on the image, is in the warning area, the target object is determined to be in this area. Alternatively, the center of gravity of the target object may be found for this determination, and, if the center of gravity is in the warning area, the target object may be determined to be in this area.

In step S31, if none of the target objects are in the warning area, then, proceeding to step S32, a warning output is inhibited. That is, without issuing the warning, a normal display operation is performed where a grayscale image captured in step S13 is displayed on the device 4.

If any of the target objects are determined to be in the warning area in step S31, then, in step S32, it is determined whether the total number of the target objects in the warning area is more than a specified number (e.g., 1). If the total number is not more than the specified number (i.e., the total number is equal to or less than the specified number), the determination in step S33 is No. Then, proceeding to step S34, a warning is issued. Specifically, a grayscale image is displayed on the device 4, and each of target object is individually emphasized as the warning. Hereinafter, this display mode in which each target object is individually emphasized is called as a first display mode.

If the total number of the target objects determined to be in the warning area is more than the specified number in step S32, then, proceeding to step S35, a warning is issued. Specifically, a grayscale image is displayed on the device 4, and one emphasized indication is displayed for the whole screen image as the warning. Hereinafter, this display mode in which one emphasized indication is displayed for the whole screen image is called as a second display mode.

As described above, there are two types of the warning output. In the first display mode (an individual emphasizing mode), each target object is individually emphasized. In the second display mode (a global emphasizing mode), one emphasized indication is displayed for every whole image to be displayed on the device 4.

Figure 5:
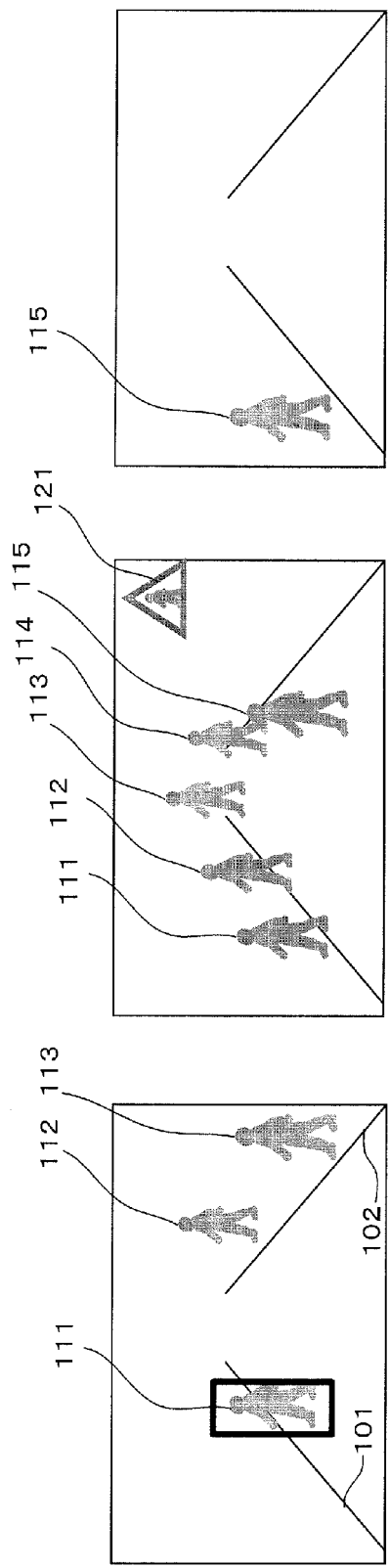
FIG. 5 is a view showing a warning indication according to one embodiment of the present invention.

FIG. 5 shows an example of a time sequence of the displayed image on the device 4, following the process shown in FIG. 3. An area between lines 101 and 102 indicates the warning area. Herein, the "specified number" used in step S33 is set to a value 1.

A pedestrian is a living body and, thus, it is actually displayed in higher brightness (i.e., in white) than a background, on the gray scale image displayed on the device 4. However, the screen images in FIG. 5 is not depicted as such, for better understanding (in FIG. 5, the pedestrian is depicted more darker than the background). The same expression style is applied in the following drawings.

At a point of time t1 shown in FIG. 5A, it is determined that one pedestrian 111 is present within the warning area. The number of the pedestrian, a target object to be warned about, is 1, so that the screen image is displayed in the first display mode, namely, the individual emphasizing mode. Thus, the pedestrian 111 is emphasized, in this example, with a frame.

At a subsequent point of time t2 shown in FIG. 5B, five pedestrians 111 to 115 are determined to be in the warning area. Because the number of the pedestrian, a target object to be warned about, is 5, the screen image is displayed in the second display mode, namely, the global emphasizing mode. In this embodiment, one icon image denoted by a reference numeral 121 is displayed on the screen image for global emphasizing. This icon image 121 corresponds to the one emphasized indication for the whole screen image. The icon 121 is a human icon with a triangle, which indicates many pedestrians are present around the vehicle. Preferably, the icon image 121 may be displayed in such a manner as to attract driver's attention. For example, the triangle may be colored in red and the icon 121 may be lit or blinked.

At a subsequent point of time t3 shown in FIG. 5C, all the pedestrians 111 to 115 have left the warning area, and therefore none of the pedestrian is any longer present within the warning area, so that a warning output is inhibited. Therefore, no emphasis is applied to any part of the screen image.

Figure 6:
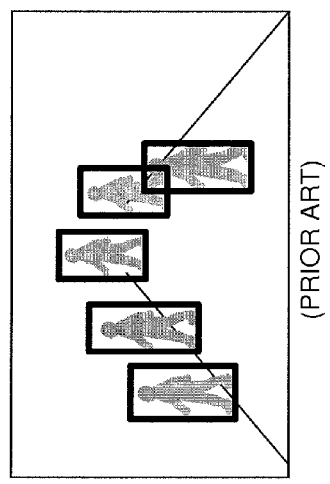
FIG. 6 is a view showing a warning indication according to one embodiment of the present invention.

In this embodiment, the warning output is switched between the first display mode and the second display mode, depending on whether the number of the target object is more than the specified number. When plural target objects are present within the warning area, one emphasized indication may be displayed for the whole screen image, as shown by the icon image 121. Conventionally, as shown in FIG. 6, each target object is always emphasized individually with a flame-like shape. In this kind of emphasis, if many of the flame-like shapes are displayed, a visibility of the screen image is degrade. As a result, a driver becomes difficult to quickly find out the target object for which should be paid his attention. According to the present invention, if the number of the target objects is determined to be more than the specified number, one emphasized indication is displayed for one whole screen image, which improve the visibility of the screen image and provides the driver with more understandable image. That is, by glancing at the one emphasized indication, the driver can instantaneously aware the presence of the plural target objects around the vehicle, that need to be paid his attention.

In the aforementioned embodiment, the icon 121 is superimposed on the screen image as the one emphasized indication in the second display mode. Nevertheless, the way of the global emphasizing is not limited thereto. Another implementation of the second display mode may be possible.

Figure 7:
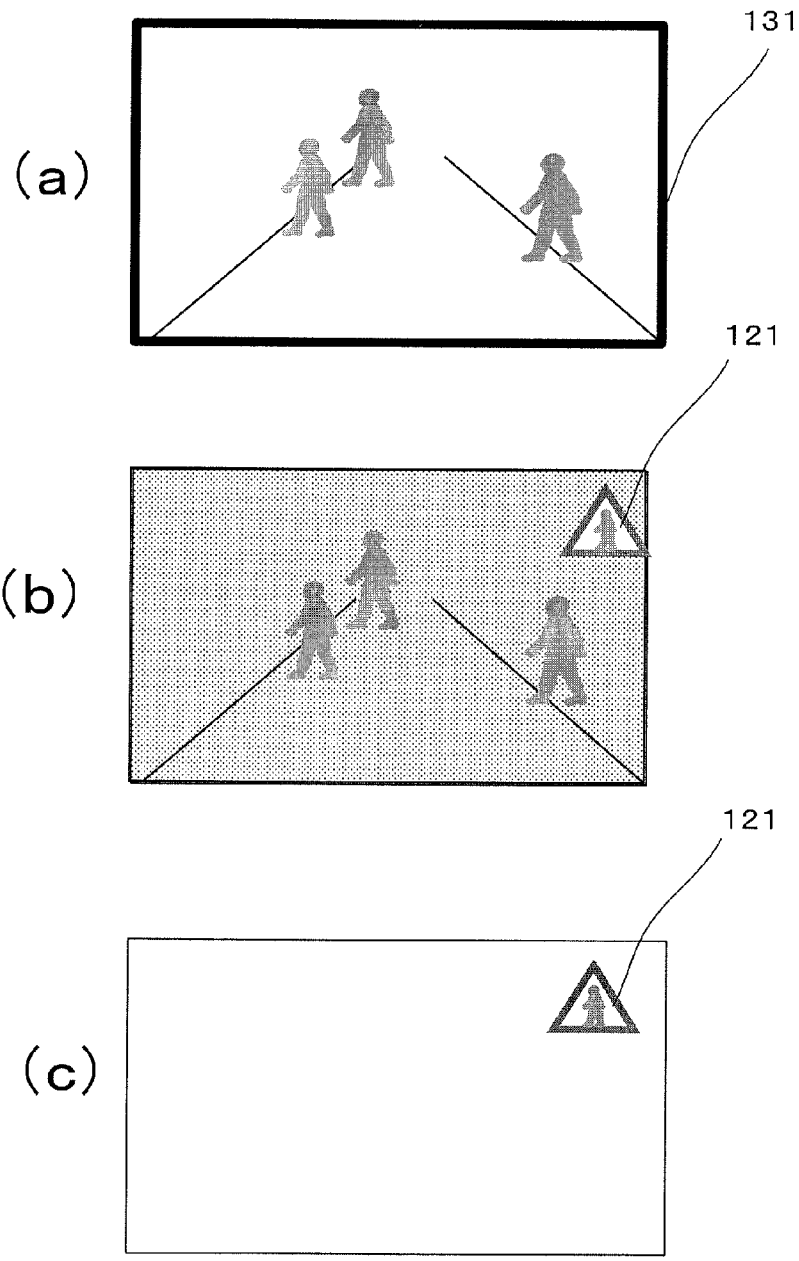
FIG. 7 is a view showing a warning indication according to one embodiment of the present invention.

Another example of the global emphasizing is shown in FIG. 7. In FIG. 7A, the global emphasizing is performed by displaying an outer frame 131 encircling the display image at its outer edge. The outer frame 131 may have a color attracting the driver's attention (e.g., red or yellow), and may be lit or blinked.

In FIG. 7B, the captured image is displayed in low contrast (e.g., intensity of each pixel is lowered by a specified value), and the icon image 121 is superimposed thereon. In this figure, an image area with lowered brightness is indicated with half-tone dot mesh. In FIG. 7C, only the icon 121 is displayed without the captured image. In FIGS. 7B and 7C, the icon 121 may be lit and blinked. By lowering the visibility of the captured image while clearly displaying the icon 121, as shown in FIGS. 7B and 7C, the driver may be prompted to look ahead carefully.

Figure 8:
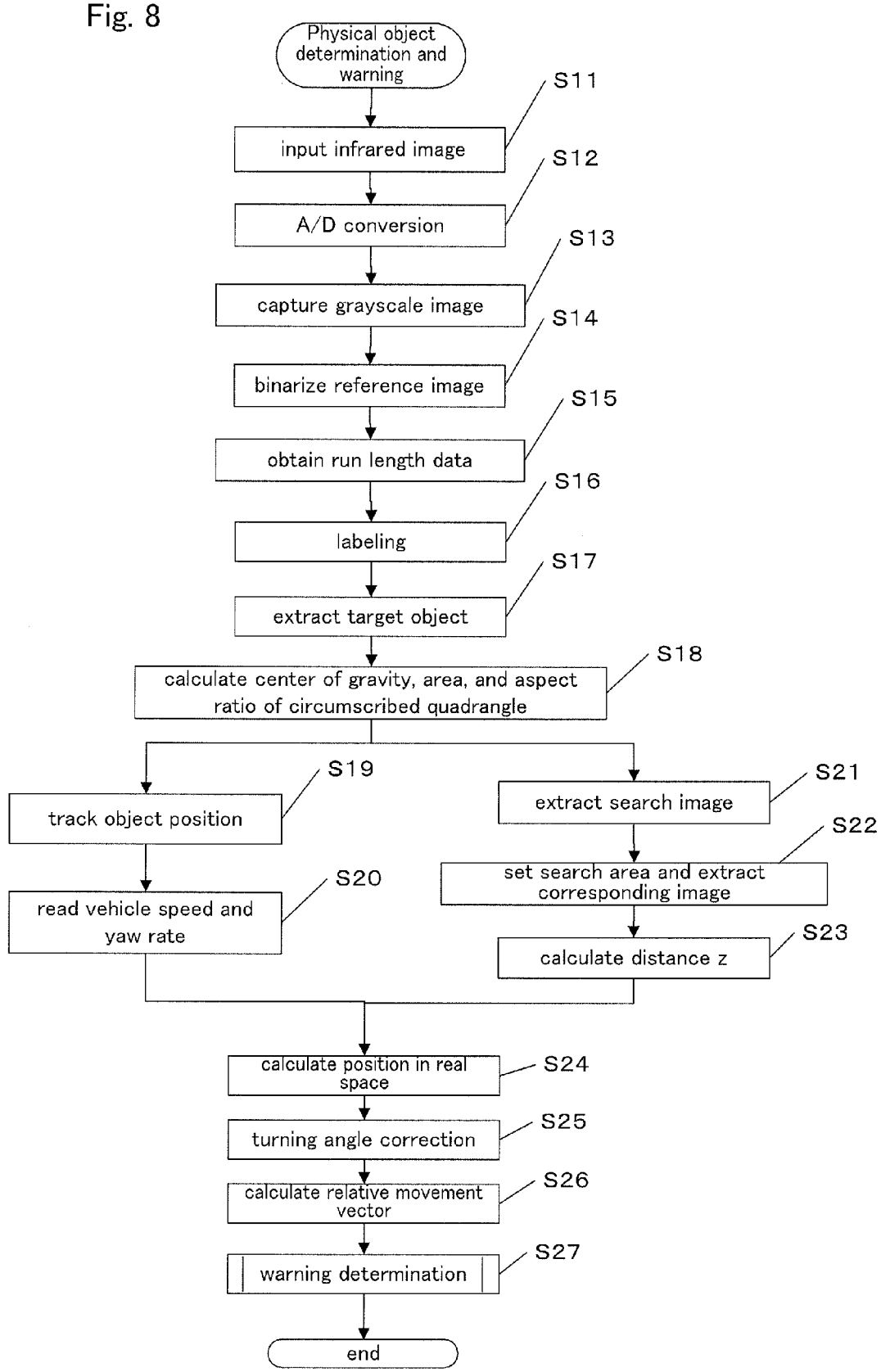
FIG. 8 is a flow chart showing a process to be executed in an image processing unit according to another embodiment of the present invention.

FIG. 8 shows a flow chart of a process to be executed by the image processing unit 2 according to the second embodiment of the present invention. The process is executed at specified intervals.

Processes in steps S11 to S17 are the same as those in FIG. 3, so that descriptions for these processes are omitted for brevity's sake. In steps S18 to S28, a relative movement vector of a target object is calculated. The method of this calculation is detailed in JP 2001-6096 A, for example, so that it is only briefly described here.

In step S18, for each target objects extracted in S17, the center of gravity G and an area S, and an aspect ratio ASPECT of a circumscribed quadrangle (i.e., a rectangle circumscribed on the target object) is calculated. The area S is calculated by integrating all length of run length data for a corresponding target object. Coordinates of the center of gravity G are calculated as the crossing point of two lines bisectioning the area S in x direction and in y direction, respectively. Instead, the center of gravity G may be defined as a position of the center of gravity of the circumscribed quadrangle. The aspect ratio ASPECT is calculated as Dy/Dx, where Dx and Dy is a length in x and y direction, of the circumscribed quadrangle, respectively.

In step S19, tracking the time sequence of object position (called simply as "tracking") is performed, where a position of the same target object is recognized iteratively at a specified sampling period. The sampling period may be set to the same value as the time intervals for the iteration of this process execution. Specifically, it is determined whether the target object A detected at a detection time k is identical to the target object B detected at the next detection time k+1, where the integer k denotes a point of time for detection of the target object. This identity determination may be performed according to a prescribed condition. For example, the target objects A and B are determined to be identical if all of the following conditions are met:

1) differences in x coordinates and y coordinates of the center of gravity G between the target objects A and B are less than predetermined tolerance values;

2) a ratio of an area size of the target object B to that of the target object A is less than a predetermined tolerance value; and 3) a ratio of an aspect ratio of a circumscribed quadrangle for the target object B to that for the target object A is less than a predetermined tolerance value.

In this way, a position of the target object (in this embodiment, the coordinates of the center of gravity G of the target object) is extracted iteratively at the sampling period, and is stored in a memory as a time-series data, together with a label assigned to the target object.

Herein, steps S14 to S19 are executed for the binarized reference image (in this embodiment, the right image).

In step S20, a turning angle θr, i.e., the angle at which the vehicle turns round, is calculated, by obtaining a vehicle speed VCAR detected by the vehicle speed sensor 7 and a yaw rate YR detected by the yaw rate sensor 6, and then integrating the yaw rate YR over time.

On the other hand, in steps S21 to S23, a distance Z to the target objects from the vehicle 10 is calculated, in parallel with the execution of steps S19 and S20. This calculation requires a longer time than the execution of steps S19 and S20, so that this calculation may be performed at a longer period than that of steps S19 and S20 (e.g., around three times longer than the execution period of steps S11-S20).

In step S21, one of the target object tracked in the binarized reference image (in this embodiment, a right image) is selected, and a local image of the selected object is set as a search image R1 (here, R1 is a circumscribed quadrangle for the selected object). In step S22, a local image corresponding to R1 in the left image (hereinafter, referred to as a corresponding image) is searched. Specifically, this search can be performed by a correlation calculation between the search image R1 and the left image. The correlation is calculated according to the following equation (1). This calculation is performed by using a grayscale image, not the binarized image.

$$C(a, b) = \sum_{n=0}^{N-1} \sum_{m=0}^{M-1} |IL(a+m-M, b+n-N) - IR(m,n)| \quad \text{equation (1)}$$

Here, the search image R1 has M×N pixels, IR(m,n) is an intensity at a position with coordinates (m,n) within R1, IL(a+m−M, b+n−N) is an intensity at a position with coordinates (m,n) within a local area in the left image having the same shape as R1, and (a,b) is a specified reference point in the local area. The corresponding image is located by searching a point giving the minimum value of a total intensity difference C(a,b), with varying coordinates (a,b) of the reference point.

Alternatively, an target area for searching in the left image may be set and the correlation operation may be performed between the search image R1 and the target area.

In step S23, a distance dR (pixel number) between a center of gravity of R1 and an image center line LCTR of the captured image (a line bisectioning the captured image in x direction), and a distance dL (pixel number) between a center of gravity of the corresponding image and the image center line LCTR, are calculated. Then, using these calculated distance, the distance z to the target object from the vehicle 10 is calculated with the following equation (2).

$$Z = \frac{B \times F}{(dL + dR) \times p} = \frac{B \times F}{\Delta d \times p} \quad \text{equation (2)}$$

Where B is a base-line length, namely, a distance in x direction (horizontal distance) between center positions of imaging devices in the cameras 1R and 1L (i.e., a space between optical axes of the both cameras), F is a focal length of a lens used in 1R and 1L, and p is a pel spacing of the imaging devices in 1R and 1L. Δd(=dR+dL) indicates a magnitude of disparity.

In step S24, image coordinates (x,y), representing a position of the target object in the image (as mentioned above, a position of the center of gravity G in this embodiment), and the distance z calculated with the equation (2), are substituted for the equation (3) to convert them into real space coordinates (X,Y,Z). Herein, as shown in FIG. 9A, the real space coordinates (X,Y,Z) represent a position in the coordinate system where x, y, and z axes represent, respectively, width direction, height direction, and traveling direction of the vehicle 10, with the origin set to a middle point between mounting positions of the cameras 1R and 1L (i.e., the positions where the cameras are fixed to the vehicle). As shown in FIG. 9B, the image coordinates represents a position in the coordinate system set on the image, where x and y axes represent horizontal and vertical direction, respectively, with the origin set to the center of the image.

$$\begin{bmatrix} X \\ Y \\ Z \end{bmatrix} = \begin{bmatrix} xc \times z/f \\ yc \times z/f \\ z \end{bmatrix} \quad \text{equation (3)}$$

$$f = F/p$$

Here, (xc, yc) is obtained by converting the image coordinate (x, y) in the right image to the coordinate in a virtual image in which has a center thereof coincident with a position corresponding to the origin of the real space coordinate system. The virtual image may be obtained on the basis of a positional relation between the mounting position of the camera 1R and the origin of the real space coordinate system. Further, f is a ratio between the focal length F and the pel spacing p.

In step S25, a turning angle correction is made in order to correct a positional shift of the image, generated while the vehicle turns. If the vehicle 10 turns, e.g., in a left direction, by an angle θr from times k to (k+1), then, on the captured image, each position shifts in (positive) x direction by Δx. Therefore, this shift is corrected.

Specifically, real space coordinates (X,Y,Z) are substituted for the equation (4) to calculate a corrected coordinates (Xr, Yr,Zr). Then, the calculated real space coordinates (Xr,Yr,Zr) are stored in the memory, in a chronological order, in connection with a corresponding target object. Hereinafter, the corrected coordinates are indicated as (X,Y,Z) for simplification.

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \quad \text{equation (4)}$$

In step S26, using the real space position data after the turning angle correction, an approximation line LMV is calculated, which corresponds to a relative movement vector of the target object against the vehicle. This calculation is made based on N real space positional data (e.g., N=10 or so) for the same target, i.e., time series data obtained at a time period ΔT. Specifically, a line expressed by the following equation (5) is obtained, where a direction vector of the approximation line LMV is L=(lx,ly,lz) (|L|=1).

$$X = u \cdot lx + Xav \quad \text{equation (5)}$$

$$Y = u \cdot lx + Yav$$

$$Z = u \cdot lx + Zav$$

$$Xav = \sum_{j=0}^{N-1} X(j)/N$$

$$Yav = \sum_{j=0}^{N-1} Y(j)/N$$

$$Zav = \sum_{j=0}^{N-1} Z(j)/N$$

In the equation (5), u is a parameter that may take on any value. Xav, Yav, and Zav are a mean value of the X, Y, and Z coordinates of the real space positional data series, respectively. The equation (5) can be rewritten as an equation (5a) by eliminating the parameter u.

$$(X-Xav)/lx=(Y-Ya)/ly=(Z-Zav)/lV \quad \text{equation (5a)}$$

Figure 10:
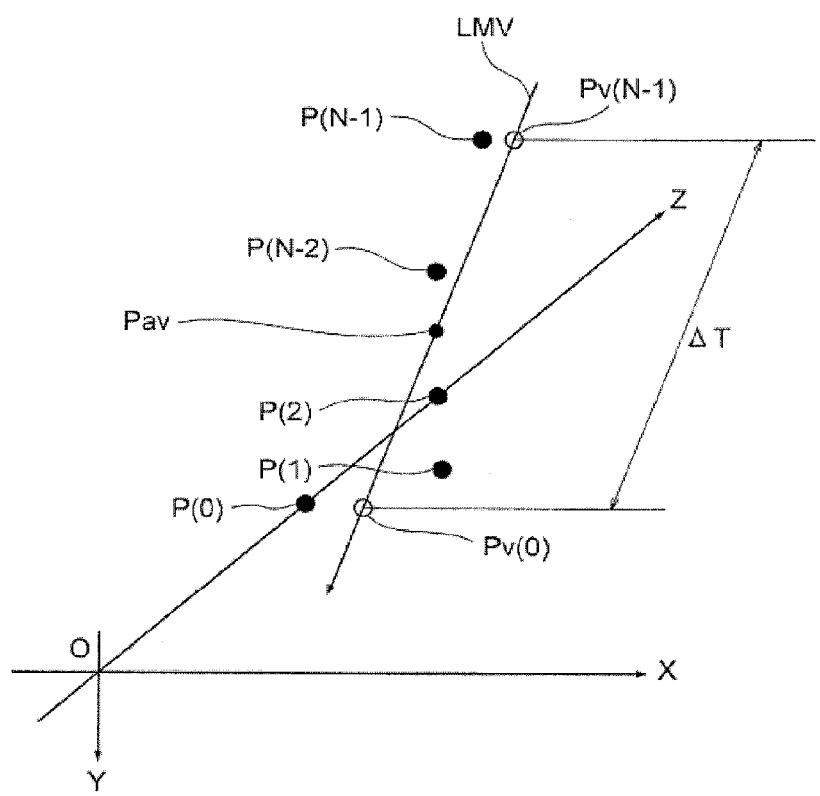
FIG. 10 is a view showing how to calculate a relative movement vector according to one embodiment of the present invention.

FIG. 10 shows an approximation line LMV for explanation. P(0), P(1), P(2), . . . , P(N−2), and P(N−1) are time-series data after the turning angle correction. The approximation line LMV is obtained as a line that passes through mean position coordinates Pay (=(Xav, Yav,Zav)) and gives the minimum mean square value of distance to the data points. Here, a number in parenthesis ( ) attached to coordinates P for each data point indicates a time order, and the higher number indicates the older data. For example, P(0) indicates the latest position coordinates, P(1) indicates a position coordinates older by 1 sample period, and P(2) indicates a position coordinates older by 2 sample period. This time-order expression is also applied to X(j), Y(j), and Z(j) described below. The method for calculating the approximation line LMV is detailed in JP 2001-6096 A.

Next, the latest position coordinates P(0)=(x(0),y(0),z(0)) and the coordinate P(N−1)=(X(N−1),Y(N−1),Z(N−1)) older by (N−1) sample period (i.e., older by a time period $\Delta T$), are corrected to match with the approximation line LMV. Specifically, P(0) and P(N−1) are corrected by following equation (6), and corrected position coordinates Pv(0)=(Xv(0),Yv(0),ZY(0)) and Py(N−1)=(Xy(N−1),Yy(N−1),Zy(N−1)) are obtained. The equation (6) is obtained by substituting Z(0) and Z(n−1) for the equation (5a).

$$Xv(j) = (Z(j) - Zav) \times \frac{lx}{lz} + Xav \quad \text{equation (6)}$$

$$Yv(j) = (Z(j) - Zav) \times \frac{lx}{lz} + Yav$$

$$Zv(j) = Z(j)$$

$$j = 0, N-1$$

A relative movement vector is calculated as a vector pointing from the position Pv(N−1) to Pv(0)

In this way, the relative movement vector of the target object is calculated from the line LMV approximating the object movement relative to the vehicle, based on plural data (N data) obtained at a monitoring period $\Delta T$. Thereby, an effect due to an error of position detection may be reduced, and the possibility of collision with the target object may be estimated more accurately.

Then, in step S27, warning determination, namely a determination whether a warning should be issued, is performed by using the relative movement vector.

Figure 11:
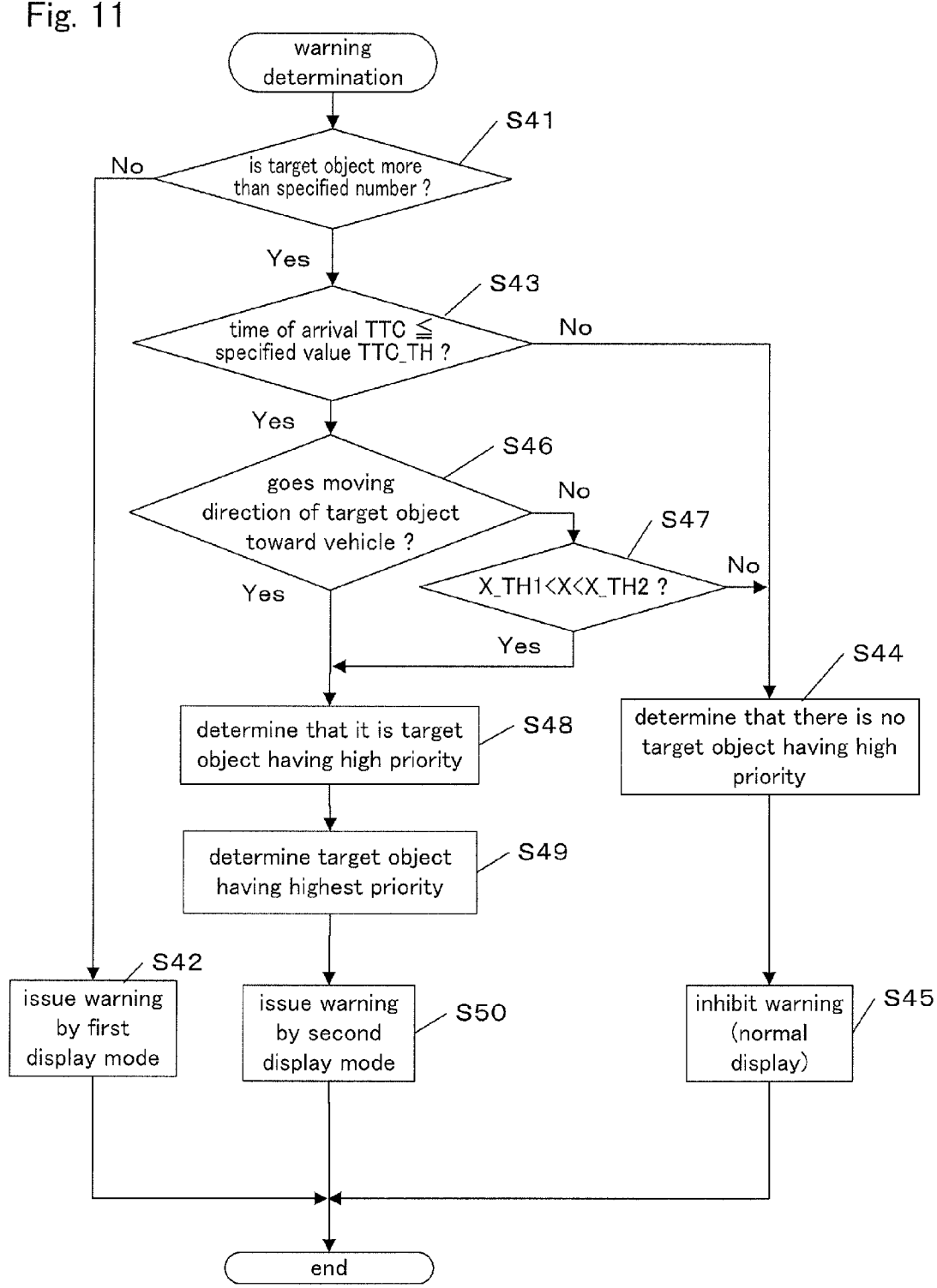
FIG. 11 is a flow chart showing a warning determination process according to one embodiment of the present invention.

FIG. 11 shows a flow chart of the warning determination to be executed in step S27.

For the target objects of which relative movement vector is calculated, it is determined whether the number of these target objects is more than a specified number (e.g. 1) in step S41. If this determination is No, a warning is issued in accordance with the aforesaid first display mode in step S42. That is, a grayscale image captured in step S13 is displayed on the display device 4, and the warning is issued by emphasizing each target object individually.

If the number of the target objects is determined to be more than the specified number in step S41, then it is determined which target object has the highest priority for warning among them, by executing the process beginning at step S43. First, in step S43, for each of these target objects, the time of arrival TTC to the vehicle is compared with the specified value TTC_TH.

A relative speed Vs of the target object against the vehicle in Z direction is calculated with the following equation (7), using Zv value of the relative movement vector that is already calculated. The time of arrival TTC is calculated by the following equation (8), using the relative movement vector Vs. Then, it is determined whether the time of arrival TTC is less than the specified value TTC_TH (e.g., 2 to 5 seconds) as shown in the following equation (9).

$$Vs = (Zv(N-1) - Zv(0))/\Delta T \quad \text{equation (7)}$$

$$TTC = Zv(0)/Vs \quad \text{equation (8)}$$

$$TTC \leq TTC\_TH \quad \text{equation (9)}$$

Here, Zv(0) is the latest distance value as detected (Zv(0) is equal to the distance before the correction for matching with the approximation line LMV, despite of the attached letter "v" denoting the corrected data), and Zv(N−1) is a distance value detected the $\Delta T$ before. In this way, for each target object, it is determined whether there exist a some possibility that the target object reaches the vehicle within the specified time TTC_TH, with respect to Z direction.

In this embodiment, a specified distance Z1 defining the areas AR1-AR3 shown in FIG. 4 corresponds to Vs×TTC_TH. Consequently, the target objects in the areas AR1-AR3 satisfy the equation (9).

If there is no target objects satisfying the equation, it implies that there is no target objects having high probability to reach the vehicle in Z direction within the specified time TTC_TH, so that the determination in step S43 is No. Then, proceeding to step S44, it is determined that no target objects have a high priority. In this case, proceeding to step S45, the warning output is inhibited. That is, a normal display mode operation is performed, in which the grayscale image captured in step S13 is displayed on the device 4, without issuing a warning.

Figure 9:
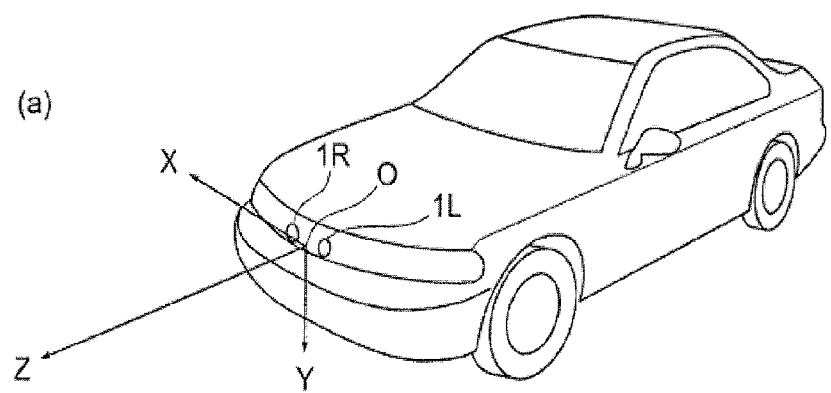
FIG. 9 is a view showing a real space coordinate system and a image coordinate system according to one embodiment of the present invention.
Figure 9:
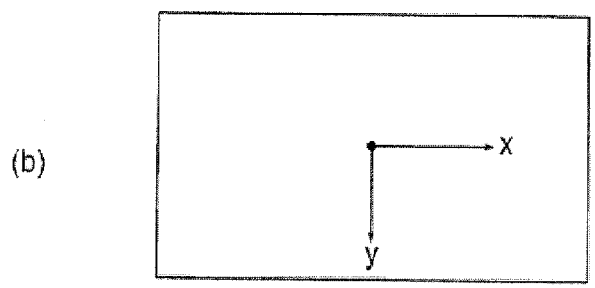

If there exist at least one target object satisfying the equation (9), the determination in step S43 is Yes. Then, proceeding to step S46, for each of the target objects satisfying the equation (9), it is determined whether a moving direction of the target object is toward the vehicle. In order to perform this determination, a Xv value of the relative movement vector of the target object is used. As described above, the relative movement vector indicates a movement from Xv(N−1) to Xv(0) in X direction during a period of $\Delta T$. Further, as shown in FIG. 9, the x coordinates represents a relative position against the origin, the position of the vehicle. Therefore, if an absolute value of the Xv(0) is less than that of the X(N−1), the target object is determined to move toward the vehicle. Conversely, if the absolute value of the Xv(0) is equal to or greater than that of the X(N−1), the target object is determined not to move toward the vehicle. In this manner, it is determined whether each of the target objects moves toward the vehicle.

If at least one target object is determined to move toward the vehicle, then, proceeding to step S48, the target objects moving toward the vehicle are determined to have high priority. On the other hand, regarding the target objects determined not to move toward the vehicle, a further determination process is performed in step S47 for each of these objects. That is, where it is determined whether the Xv(0) of the target object is within the specified range (XX_TH1-X_TH2) centered at the vehicle position.

The target objects satisfying the relation of X_TH1< Xv(0)<X_TH2 can be determined not to move toward the vehicle. However, such target objects still have a some possibility to collide against the vehicle if those target objects continue to stay there. Therefore, if there exist at least one target object satisfying the relation of X_TH1<Xv(0)< X_TH2, then, proceeding to step S48, the target objects satisfying the relation are determined to have high priority. Conversely, if there is no target object satisfying the relation of X_TH1<Xv(0)<X_TH2, then, proceeding to step S44, it is determined that no target object has high priority.

In this manner, in step S48, a high priority is given to target objects having TTC less than the specified value, which is moving toward the vehicle or lying in the area having a specified width centered at the vehicle position along its width direction.

If there exist more than one target object which is determined to have a high priority in step S48, then, in step S49, it is determined which target object has the highest priority among them. The purpose of this process is to determine one target object to which the driver should pay his maximum attention. Any proper technique may be adopted for this purpose.

For example, the possibility of collision for each target object may be expressed by using the time of arrival TTC and the latest X value, namely, the Xv(0), as parameters. For instance, a product of the parameter TTC value and an absolute value of the parameter Xv(0) is used as an index indicating a degree of the possibility of collision. The shorter the time of arrival TTC and the smaller the absolute value of the Xv(0), the higher the possibility of collision is. Therefore, the smaller product indicates the higher possibility of collision. Accordingly, a target object having the smallest product value may be determined to have the highest priority.

Alternatively, the possibility of collision may be expressed by using the time of arrival TTC, Xv(0), and a speed in X direction, as parameters. A speed Xs in X direction can be calculated by an equation (Xv(N−1)−Xv(0))/ΔT. The higher the speed Xs, the higher the possibility of collision is. Therefore, for example, the parameter TTC value, an absolute value of the parameter Xv(0), and a inverse of the speed Xs are multiplied together to obtain a value indicating the degree of the possibility of collision. And, the target object giving the smallest product of this multiplication is determined to have the highest priority.

The degree of possibility of collision may be determine by using any of the parameters including the time of arrival TTC, the Xv(0), and the speed in the X direction. Further, in addition to these parameters, or instead of any of them, another parameter may be used (e.g., a z-direction position Zv(0) of the target object).

Figure 12:
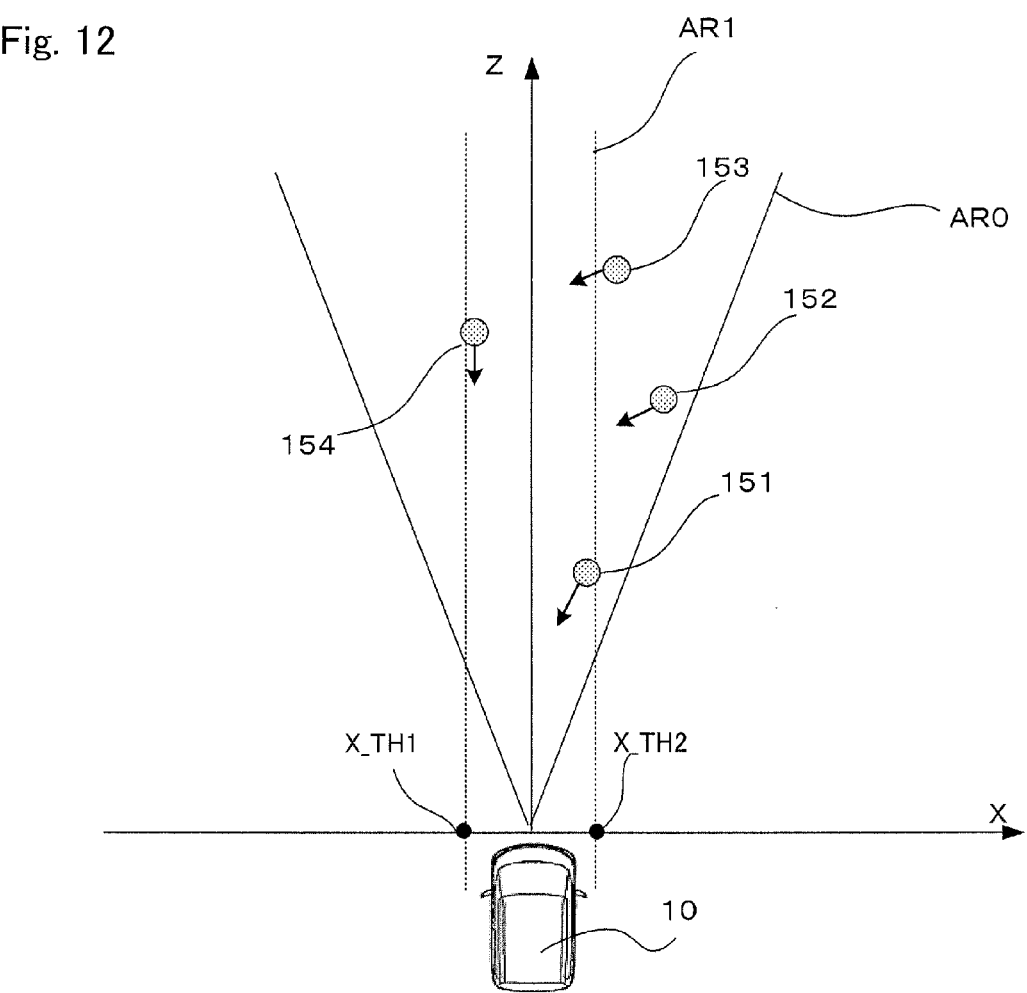
FIG. 12 is a view explaining how to determine a priority according to one embodiment of the present invention.

FIG. 12 shows a situation, as an example, where plural target objects 151 to 154 are in the imaging area AR0 of the vehicle 10. An arrow attached to the target objects 151 to 154 indicate a relative movement vector of them. These target objects 151 to 154 is assumed to have the time of arrival TTC equal to or less than the specified value TTC_TH. An area between two lines passing through the points X_TH1 and X_TH2, respectively, corresponds to the approach determination area AR1 shown in FIG. 4. This represents a moving path area of the vehicle 10.

The target objects 151 to 153, as can be seen from their relative movement vectors, move toward the vehicle in X direction. Thus, a result of the determination made for these target objects in step S46 is Yes. Although the target object 154 does not move toward the vehicle in X direction, it is determined in step S47 that the target object 154 is in the area extending in X direction from X_TH1 to X_TH2. Accordingly, all the target objects 151 to 154 are determined to have high priority.

As mentioned above, it is determined which target object has the highest priority among 151-154. For example, the time of arrival TTC and an absolute value of Xv(0) of each target object may be used as parameters to calculate a value representing the possibility of collision, and a target object having the value representing the highest possibility of collision is determined to have the highest priority.

Referring back to FIG. 11, after the target object having the highest priority is determined in this way, then, proceeding to step S50, a warning is issued by using the second display mode. Specifically, a grayscale image is displayed on the device 4 and only the target object having the highest priority is emphasized in the image. That is, one emphasized indication is displayed for a whole screen image.

Even if plural target objects exist, the emphasis is applied to only one target object having the highest priority, to which the driver should pay his maximum attention. Therefore, the screen image displayed in this mode is easy to understand for the driver, compared with a display mode in which all of the plural target objects is emphasized individually. Hence, the driver can instantaneously recognize a target object to which the maximum attention should be paid.

FIG. 13 shows an example of a time sequence of the image displayed on the device 4, according to the process shown in FIG. 11. Lines 161 and 162 correspond to the lines passing X_TH1 and X_TH2, respectively, which are already described with respect to step S47 and FIG. 12. Further, the "specified number" in step S41 is assumed to be 1.

At a point of time t1 shown in FIG. 13A, the number of the detected pedestrian 171 is 1, so that a result of the determination made in step S41 is No. Consequently, a warning is issued using the first display mode. That is, the warning is issued by emphasizing the pedestrian with a frame.

At a subsequent period of time t2 shown in FIG. 13B, the number of the detected pedestrians 172-175 is 4, so that a warning is issued by means of the second mode. Herein, it is assumed that the pedestrians 172-175 correspond to the target objects 151-154 shown in FIG. 12, respectively. As described with reference to FIG. 12, all the pedestrians 172-175 are determined to have high priority. One pedestrian among others is determined to have the highest priority. In this example, a target object 151 (i.e., a pedestrian 172) is determined to have the highest priority. As a result, only the pedestrian 172 is emphasized with a frame.

The frame indicated in the first display mode shown in FIG. 13A and the frame indicated in the second display mode shown in FIG. 13B may be different. For example, the frame for the second display mode may have such a color and shape that attract the driver's attention more effectively, compared with the frame for the first display mode. For example, the frame for the first display mode may be drawn by a thin red line while that for the second mode may be drawn by a thick red line. Instead, the former may be lit in red and the latter may be blinked in red.

Whereas, in this embodiment, the target object to be notified with a warning is emphasized by adding a frame thereto on the image, the emphasis may be performed in a different way. For example, the target object may be emphasized by displaying thereon another specified image such as an icon.

Moreover, the second display mode may be implemented as a combination of the emphasis on the highest-priority object and that shown in FIG. 7. For example, when a warning is issued in the second display mode in step S50, the highest-priority object may be displayed with an emphasis while an outer frame 131 shown in FIG. 7A may be displayed and lit or blinked. Instead of the frame 131, as shown in FIG. 7B, brightness of an area other than that of the highest-priority object may be lowered. In the latter case, the contrast between the highest-priority object and others becomes high, so that a driver's attention is more strongly attracted to this object.

As an alternative, the second embodiment may be partially combined with a part of the first embodiment. For example, in the second embodiment, if the determination at step S41 in FIG. 11 is No (i.e., the number of the target objects are less than the specified number), it is determined whether the target objects are present within the specified warning area, as mentioned in the first embodiment. If the target objects are present within the warning area, a warning is issued by means of the first display mode, as stated in step S34 in FIG. 3. Further, if the determination in step S41 is Yes (i.e., the target objects are more than the specified number) and no target object is determined to have high priority in step S44, it is determined whether the target objects are present within the warning area.

If the target objects are present within the warning area, a warning is issued by means of the second display mode, as stated in step S35 shown in FIG. 3. Here, the second display mode may be implemented so that one emphasized indication such as an icon image shown in FIGS. 5B and 7 is displayed. If the determination in step S41 is Yes and it is determined that there exist a target object having high priority, a warning is issued by means of the second display mode in step S50 shown in FIG. 10. Here, the second display mode may be implemented so that one emphasized indication for the highest-priority object is displayed, as shown in FIG. 12B.

In any one of the aforesaid embodiments, by setting the "specified number" to a value 1, the number of the emphasized indication in the display image is always limited to one. Consequently, the driver can understand instantaneously the warned situation on the display image. The specified number is not necessarily limited to 1. Preferably, it is researched and determined in advance what the number of the emphasized indication is that begins to make the driver feel difficult to understand the image. And, on the basis of the result of it, the aforesaid specified number is set fewer than the determined number.

In the embodiments described above, the display device 4 of the navigation system is utilized. Using the display mode according to the present invention, the driver can understand the display image in very short time. Therefore, a driving operation may not be influenced by the arrangement of the display device, for example, where the device is mounted at the left side or at the right side of the driver. The display mode according to the present invention is applicable to other type of display device such as a head up display that is typically used for the purpose of monitoring the around area.

Further, when a warning is issued in the process in FIGS. 3 and 10, warning sounds may be produced from the speaker 3. The any sounds, such as a simple buzzer sound or voice messages, may be used as the audible warning.

Furthermore, instead of the far infrared camera used in the aforementioned embodiments, other types of camera (e.g., a visible camera) is also applicable to the present invention.

As stated above, whereas the description is made to the specific embodiments of the present invention, the present invention is not intended to limit to these embodiments.

REFERENCE SIGNS LIST 1R,1L: infrared camera (means for imaging)
2: image processing unit
3: speaker
4: display device

The invention claimed is:

1. A surrounding area monitoring apparatus for a vehicle comprising:
an imaging device to capture images of an area around the vehicle;
an image processing unit including a processor and a memory that is configured to:
detect target objects in the area on the basis of images captured by the imaging device;
present the captured images on a display device; and
warn a driver of the detected objects by presenting a warning indication in the captured image on the display device,
wherein, when a total number of the target objects simultaneously detected is equal to or less than a predetermined number, the image processing unit presents the warning indication of a first display mode that includes an indication emphasizing each of the detected target objects,
wherein, when the total number is greater than the predetermined number, the image processing unit presents the warning indication of a second display mode that includes one emphasized indication predefined, for the whole image on the display device, without presenting the warning indication of the first display mode, and
wherein the predetermined number is a natural number other than zero.

2. The apparatus according to claim 1, wherein the image processing unit superimposes a predefined image at a predetermined position onto the presented image on the display device, as the one emphasized indication of the second display mode.

3. The apparatus according to claim 1, wherein, when the total number is greater than the predetermined number, the image processing unit determines a priority for warning of each of the detected target object, and emphasizes the target object having the highest priority, as the one emphasized indication of the second display mode.

4. The apparatus according to claim 1, wherein the display device is shared with a car navigation system.

5. A surrounding area monitoring apparatus for a vehicle comprising:
an imaging device, mounted on a vehicle, that images an area around the vehicle;
means for detecting target objects in the area on the basis of images captured by the imaging device;
means for presenting the captured images on a display device; and
means for warning a driver of the detected objects by presenting a warning indication in the image on the display device,
wherein, when a total number of the target objects simultaneously detected is equal to or less than a predetermined number, the means for warning presents the warning indication of a first display mode that includes an indication emphasizing each of the detected target objects,
wherein, when the total number is greater than the predetermined number, the means for warning presents the warning indication of a second display mode that includes one emphasized indication predefined, for the whole displayed image, without presenting the warning indication of the first display mode, and
wherein the predetermined number is a natural number other than zero.

6. The apparatus according to claim 5, wherein the means for warning superimposes a predefined image at a predetermined position onto the displayed image on the display device, as the one emphasized indication of the second display mode.

7. The apparatus according to claim 5, wherein, when the total number is greater than the predetermined number, the means for warning determines a priority for warning of each of the detected target object, and emphasizes the target object having the highest priority, as the one emphasized indication of the second display mode.

8. The apparatus according to claim 5, wherein the display device is shared with a car navigation system.

9. A method for monitoring surroundings of a vehicle comprising:
capturing images of surrounding area around the vehicle by an imaging device;

detecting target objects in the area on the basis of images captured by the imaging device;

presenting the captured images on a display device; and warning a driver of the detected objects by presenting a warning indication in the image on the display device, wherein, when a total number of the target objects simultaneously detected is equal to or less than a predetermined number, the warning indication of a first display mode that includes an indication emphasizing each of the detected target objects is presented on the display device, wherein, when the total number is greater than the predetermined number, the warning indication of a second display mode that includes one emphasized indication predefined is presented for the whole displayed image on the display device, without the warning indication of the first display mode, and wherein the predetermined number is a natural number other than zero.

10. The method according to claim 9, wherein a predefined image is superimposed at a predetermined position onto the displayed image on the display device, as the one emphasized indication of the second display mode.

11. The method according to claim 9, wherein, when the total number is greater than the predetermined number, a priority for warning of each of the detected target object is determined, and the target object having the highest priority is emphasized as the one emphasized indication of the second display mode.

12. The method according to claim 9, wherein the display device is shared with a car navigation system.

* * * * *